US006240296B1

(12) United States Patent
Yu et al.

(10) Patent No.: US 6,240,296 B1
(45) Date of Patent: May 29, 2001

(54) METHOD AND APPARATUS FOR SUPPORTING SHORT MESSAGE SERVICES IN A WIRELESS NUMBER PORTABILITY ENVIRONMENT

(75) Inventors: I-Hsiang Yu, Falls Church, VA (US); May Y. Chan, Waltham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/037,502

(22) Filed: Mar. 10, 1998

(51) Int. Cl.[7] .................................................. H04Q 7/20
(52) U.S. Cl. .................. 455/466; 455/412; 455/560; 379/88.22
(58) Field of Search ........................ 455/466, 412, 455/560, 414, 461, 462, 433; 379/88.08–88.28, 210–212, 220, 40; 340/825.44; 370/236, 352–360, 372

(56) References Cited

U.S. PATENT DOCUMENTS

| 5,181,238 | * | 1/1993 | Medamana et al. ............... 379/93.03 |
| 5,440,626 | * | 8/1995 | Boyle et al. ......................... 379/219 |
| 5,475,746 | * | 12/1995 | Miller et al. ........................ 379/201 |
| 5,805,997 | * | 9/1998 | Farris .................................... 455/461 |
| 5,862,129 | * | 9/1999 | Bell et al. ............................ 370/236 |
| 5,937,355 | * | 8/1999 | Joong et al. ......................... 455/466 |
| 5,943,399 | * | 8/1999 | Bannister et al. ................ 379/88.17 |
| 5,946,630 | * | 8/1999 | Willars et al. ...................... 455/466 |
| 5,949,865 | * | 9/1999 | Fusinato .............................. 379/207 |
| 5,950,123 | * | 9/1999 | Schwelb et al ..................... 455/414 |

OTHER PUBLICATIONS

CTIA Report on Wireless Number Portability, created by the Number Portability Sub–Task Group on behalf of the Cellular Telecommunications Industry Association Number Advisory Group, Revision 1.0, Apr. 11, 1997.

* cited by examiner

*Primary Examiner*—William G. Trost
*Assistant Examiner*—Charles Craver
(74) *Attorney, Agent, or Firm*—Leonard Charles Suchyta

(57) ABSTRACT

In a Wireless Number Portability (WNP) environment, a scheme is provided for routing and delivering Short Message Service (SMS) messages. In a WNP environment, the mobile identification number (MIN) and mobile directory number (MDN) will become independent, and the existing method of routing SMS messages will be inadequate to provide SMS to subscribers that port from one service provider to another. Methods and systems for delivering SMS messages to ported subscribers are provided.

20 Claims, 10 Drawing Sheets

* THESE MESSAGES ARE SENT IF THE HLR DOES NOT HAVE A CURRENT SMS ROUTING ADDRESS.

* THESE MESSAGES ARE SENT IF THE HLR DOES NOT HAVE A CURRENT SMS ROUTING ADDRESS

METHOD AND APPARATUS FOR SUPPORTING SHORT MESSAGE SERVICES IN A WIRELESS NUMBER PORTABILITY ENVIRONMENT

BACKGROUND OF THE INVENTION

The present invention relates to wireless network services, and more particularly to the Short Message Service (SMS) feature and its implementation in a Wireless Number Portability (WNP) environment.

Several FCC Orders on Telephone Number Portability, CC Docket No. 95-116 (i.e., First Report and Order, released Jul. 2, 1996; First Memorandum Opinion and Order on Reconsideration, released Mar. 11, 1997; and Second Report and Order, released Aug. 18, 1997) mandate that all Commercial Mobile Radio Service (CMRS) providers participate in Number Portability (NP), i.e., provide the capability to deliver calls from their networks to ported numbers. NP in wireless networks is referred to as Wireless Number Portability (WNP). Because wireless subscribers are mobile and are not associated with any fixed location or serving switch, there are many special considerations when implementing number portability in the wireless environment.

The purpose of WNP is to allow a wireless subscriber to change its subscription to a different wireless service provider while the number that callers dial to reach the subscriber remains unchanged. Prior to number portability in the wireless arena, service providers used a single number— the Mobile Identification Number (MIN)—not only for delivery of calls to the wireless subscriber, but also for registration and authentication when the wireless subscriber moves from one service area to another. For a 10-digit MIN of the form NPA-NXX-XXXX (traditional North American Numbering Plan format), the first six digits were sufficient to route a call and to register a subscriber, i.e., to determine the service provider and home network of the subscriber. If the single MIN became portable, six digits would no longer be sufficient, and registration would require a 10-digit translation or database dip.

To solve this problem, the wireless industry has decided to assign two independent numbers to a subscriber—a Mobile Directory Number (MDN) and a Mobile Station Identification Number (MSID). The MDN is a dialable number in the NPA-NXX-XXXX format. The MSID can be in the format of either a Mobile Identification Number (MIN) or an International Mobile Station Identification (IMSI). The MDN will be portable so that when a subscriber changes service providers, the MDN can be retained by the subscriber. The MSID belongs to a specific service provider's network, so that when the subscriber changes service providers, it receives a new MSID. Before a particular subscriber is ported, the MDN and MSID will most likely be identical, if the MSID is in MIN format. When a subscriber ports to a new service provider, it surrenders its old MSID to the donor network and receives a new MSID from the network of the new service provider. The ported subscriber's MDN remains unchanged. Mobile registration continues to use the first six digits of the MSID to determine the subscriber's home network.

For call routing in a WNP environment, the wireless industry has agreed to use the wireline call routing technique, known as Location Routing Number (LRN) Routing. The LRN is a 10-digit number in NPA-NXX-XXXX format that identifies the subscriber's serving switch. A Number Portability database (NP-DB) maintains a mapping of ported MDN numbers to their serving switch LRNs. The NP-DB may be, for example, a Service Control Point (SCP). During call routing and processing, the network queries the NP-DB for the serving switch LRN corresponding to the subscriber's MDN.

The Short Message Service (SMS) feature provided by wireless networks provides short text messaging from or to a wireless device. Before the implementation of WNP, a calling party using the SMS feature initiates a short message and provides the called party's MIN to the originating network. The originating network then routes the short message to the destination home system using the dialed MIN. In a pre-WNP environment, the first six digits of the dialed MIN provide sufficient routing information for the short message to be delivered to the destination home system of the short message receiver.

FIG. 1 illustrates the network components that may be involved in routing and delivering a short message in a pre-WNP environment. The procedures to process and deliver an SMS message are defined in Interim Standard 41 (IS-41) Revision C, a signaling protocol used in wireless networks. Referring to FIG. 1, within network 10, a short message originates at a subscriber in originating system 12 and is destined for a mobile station (MS) currently served by destination serving system 14. Destination home system 16 is the home system of the destination MS. Communications regarding routing and delivery of the short message, as well as delivery of the short message itself, occur over signaling network 18. The originating subscriber, not particularly shown for the sake of clarity, is served by Mobile Switching Center (MSC) 20 in originating system 12. Originating home system 13 contains Message Center (MC) 22 for storing short messages. The destination MS, not particularly shown for the sake of clarity, is served by MSC 24 in destination serving system 14. Destination home system 16 contains MC 26, which is coupled to Home Location Register (HLR) 28, a database that stores subscriber information for wireless networks. Alternatively, if MC 26 and HLR 28 are not co-located, they may communicate via signaling network 18.

FIGS. 2 and 3 illustrate two existing methods of routing an SMS message in a pre-WNP environment, known in the art as direct routing and force indirect routing, respectively. In direct routing, the short message is sent to the destination home MC directly from the sender's serving MSC. In force indirect routing, the short message is routed from the sender's serving MSC through the sender's home MC to the destination home MC.

FIG. 2 illustrates the existing procedures for delivering an SMS message using direct routing. With reference to FIGS. 1 and 2, originating system MSC 20 routes an SMS Delivery Point to Point (SMDPP) message over signaling network 18 directly to destination home MC 26 by performing an $MIN_{receiver}$-to-MC mapping, i.e., mapping the MIN of the destination provided by the originating subscriber to the address of the destination home system MC associated with that MIN. This mapping requires only the first six digits of the MIN, which uniquely define the destination home system. The mapping is done via Global Title Translation (GTT) at a Signaling Transfer Point (STP) in signaling network 18 (not shown), via an internal table at originating system MSC 20 (not shown), or via a third party performing similar functions (not shown). Destination home MC 26 responds with an smdpp positive acknowledgment over signaling network 18. When destination home MC 26 receives the SMDPP request, it contacts HLR 28 to obtain an SMS routing address for destination MSC 24. "SMSREQ [MIN]" in FIG. 2 corresponds to the MC 26 request from HLR 28. If HLR 28 has a current SMS routing address for MSC 24, HLR 28 returns the address to destination home MC 26. This is noted in FIG. 2 as the "smsreq[SMSADDR]" between HLR 28 and MC 26. Otherwise, HLR 28 requests an SMS routing address from destination MSC 24, which request is designated in FIG. 2 by "SMSREQ[MIN, ESN], and returns that address, SMSADDR, to destination home MC 26. This is noted in FIG. 2 by the "smsreq [SMSADDR]" flowing from MSC 24 to HLR 26 to MC 26. Destination home MC 26 then forwards the SMDPP toward destination MSC 24 using the SMS routing address, SMSADDR.

FIG. 3 illustrates the existing procedures for delivering an SMS message using force indirect routing. With reference to FIGS. 1 and 3, originating system MSC 20 routes an SMDPP indirectly to originating home MC 22 by performing an $MIN_{sender}$-to-MC mapping, i.e., mapping the MIN of the originating subscriber to the MC of the originating home system. This mapping is done either via GTT at an STP in signaling network 18 or via an internal table at originating system MSC 20, not particularly shown. Originating system MC 22 responds with an smdpp positive acknowledgment. Originating system MC 22 then forwards the SMDPP to destination home MC 26 by performing an $MIN_{receiver}$-to-MC mapping, i.e., mapping the MIN of the destination provided by the originating subscriber to the MC of the destination home system associated with that MIN. This mapping requires only the first six digits of the MIN, which uniquely define the destination home system. The mapping is done either via GTT at an STP in signaling network 18 or via an internal table at originating system MC 22, not particularly shown. Destination home MC 26 responds with an smdpp positive acknowledgment. When destination home MC 26 receives the SMDPP request, it contacts HLR 28 to obtain an SMS routing address for MSC 24. "SMSREQ[MIN]" in FIG. 3 corresponds to the MC 26 request from HLR 28. If HLR 28 has a current SMS routing address for MSC 24, HLR 28 returns the address to destination home MC 26. This is noted in FIG. 3 as the "smsreq [SMSADDR]" between HLR 28 and MC 26. Otherwise, HLR 28 requests an SMS routing address from destination MSC 24, which request is designated in FIG. 3 by "SMSREQ[MIN, ESN], and returns that address, SMSADDR, to destination home MC 26. This is noted in FIG. 3 by the "smsreq[SMSADDR]" flowing from MSC 24 to HLR 26 to MC 26. Destination home MC 26 then forwards the SMDPP toward destination MSC 24 using the SMS routing address, SMSADDR.

When wireless networks implement WNP, the MDN and MSID will be separate numbers. As a result, SMS will fail when delivering a short message to a ported MS. When the destination MS ports to another service provider, it receives a new MIN, as the mobile station identification (MSID) number, and retains the existing MDN. The first six digits of the new MSID identify the new service provider to the network. However, when originating a short message to the ported MS, the sender will provide only the destination MDN to the network since MINs are transparent to subscribers. The MDN alone does not provide the originating system enough information to derive the identity of the destination home system. To determine the destination home system, the originating system would have to perform a full 10-digit translation to obtain a physical address corresponding to the destination home system. Such a translation process requires extremely large translation tables, and synchronization of data in these translation tables would make it difficult and impractical to perform 10-digit translations.

It is desirable, therefore, to provide a scheme for locating a ported subscriber's destination home MC in a WNP environment without performing a 10-digit translation in the originating system. It is also desirable to provide a scheme for routing SMS messages using the MDN of the destination MS. It is even more desirable to provide such a scheme that has minimal impact on existing network elements and requires a minimum of new capabilities.

SUMMARY OF THE INVENTION

The present invention satisfies those desires by providing a methodology for routing and delivering SMS messages to a ported subscriber using the destination's MDN.

A method consistent with the present invention for transmitting a short message service (SMS) message in a wireless network comprises the steps of receiving the message from an originating system at a donor system MC, translating the MDN provided by an originating subscriber to an address associated with a destination home MC, and routing the message from the donor system MC to the destination home MC using the address. Another method consistent with the present invention for transmitting an SMS message in a wireless network comprises the steps of routing the message from an originating system to a database, translating the MDN provided by an originating subscriber to a routing number associated with the destination subscriber, routing the message from the database to a signaling network, translating the routing number to an address associated with the destination home MC, and routing the message to the destination home MC using the address. Yet another method consistent with the present invention for transmitting an SMS message in a wireless network comprises the steps of routing the message from an originating system to a database, translating the MDN provided by an originating subscriber to a point code associated with the destination home MC, routing the message from the database to a signaling network, and routing the message from the signaling network to the destination home MC using the point code.

Systems are also provided for carrying out the methodologies of the present invention.

The advantages accruing to the present invention are numerous. The present invention provides a method for routing and delivering SMS messages after the implementation of number portability in wireless networks. The present invention can also be used to deliver SMS messages in a non-WNP environment when the MSID and MDN are different because the MSID is in IMSI format. Additionally, the present invention uses existing network elements where possible and requires a minimum of additional capabilities.

The above desires, and other desires, features, and advantages of the present invention will be readily appreciated by one of ordinary skill in the art from the following detailed description of the preferred implementations when taken in connection with the accompanying drawings.

DETAILED DESCRIPTION OF THE PREFERRED EMBODIMENTS

Detailed methodologies for supporting SMS message routing in a WNP environment will now be presented.

Figure 4:
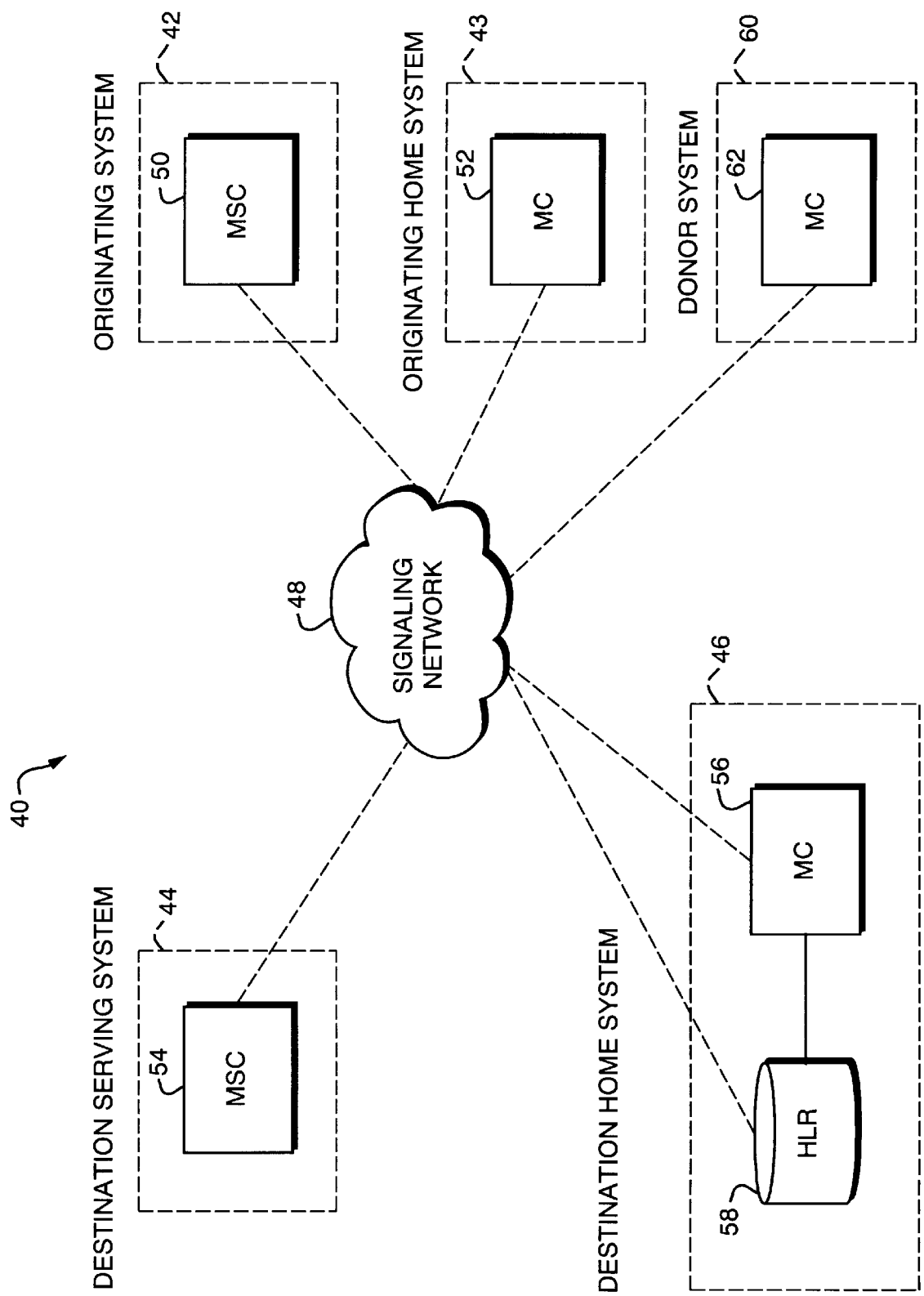
FIG. 4 is a high level block diagram of a network in which a scheme for delivering SMS consistent with the present invention may operate.

FIG. 4 illustrates a network in which a method consistent with one embodiment of the present invention operates. Within a telecommunications network, indicated generally by reference numeral 40, a short message originates at a subscriber in originating system 42 and is destined for a mobile station (MS) currently served by destination serving system 44. The destination MS has ported from donor system 60 to destination home system 46, the current home system of the destination MS. Communications regarding routing and delivery of the short message, as well as delivery of the short message itself, occur over signaling network 48. The originating subscriber, not particularly shown for the sake of clarity, is served by Mobile Switching Center (MSC) 50 in originating system 42. Originating home system 43 contains Message Center (MC) 52 for storing short messages. The destination MS, not particularly shown for the sake of clarity, is served by MSC 54 in destination serving system 44. Destination home system 46 contains MC 56, which is coupled to Home Location Register (HLR) 58, a database that stores subscriber information for wireless networks. Alternatively, if MC 56 and HLR 58 are not co-located, they may communicate via signaling network 48. Donor system 60 includes donor MC 62, which is used to locate destination home MC 56 in one embodiment consistent with the present invention, as detailed in FIG. 5.

Figure 5:
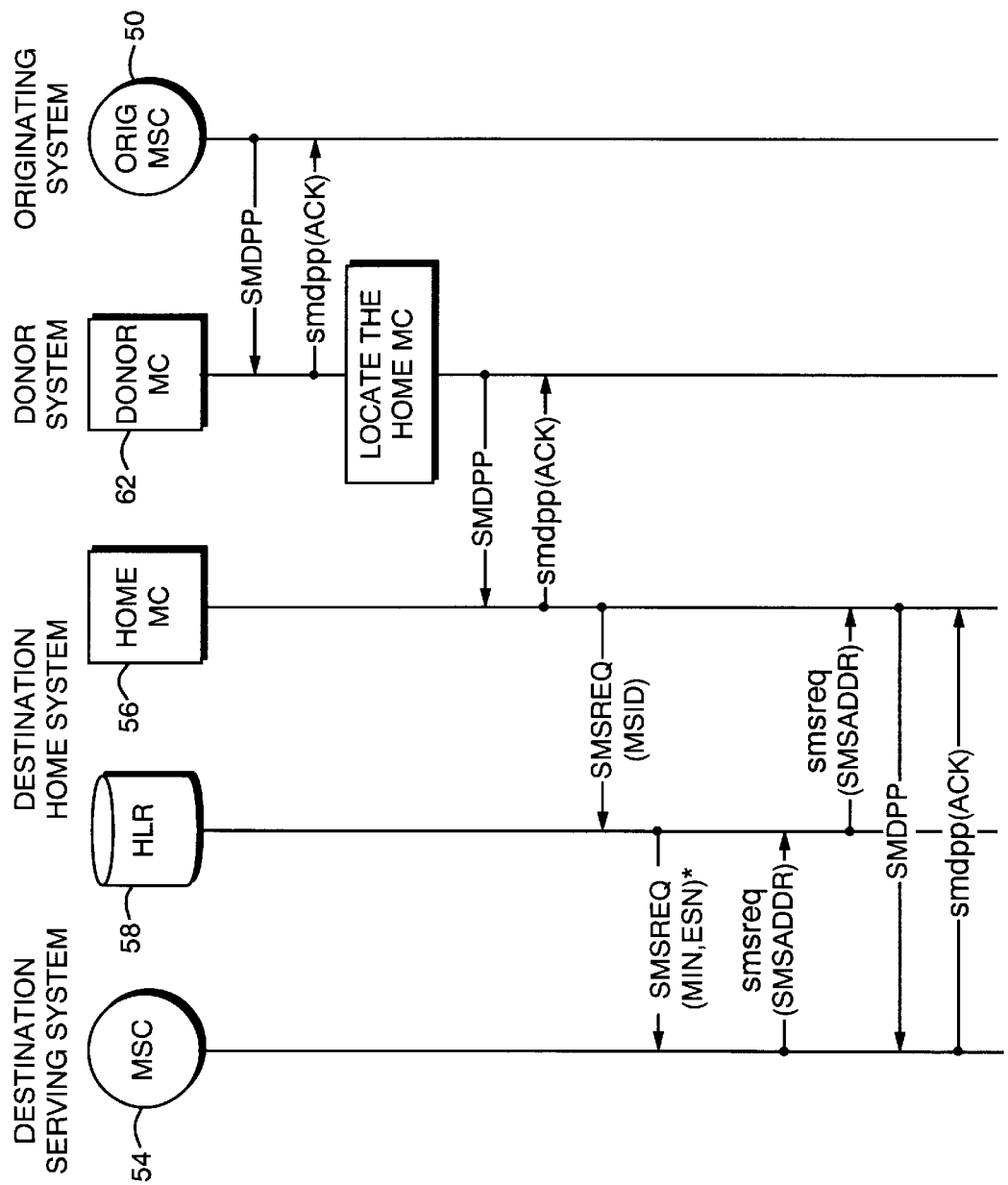
FIG. 5 is a flow diagram of a method for supporting SMS consistent with the present invention.

FIG. 5 is a call flow diagram illustrating a method for successfully routing SMS messages via donor system 60 consistent with the present invention. This method relies on donor system 60, and donor MC 62 in particular, to locate destination home MC 56 based on the destination's MDN and to forward SMS messages when the destination has been ported. As illustrated in FIG. 5, originating MSC 50 routes an SMDPP message to donor MC 62 by performing an MDN-to-MC mapping, i.e., mapping the MDN of the destination provided by the originating subscriber to the MC of the donor system associated with that MDN. This mapping requires a translation of the first six digits of the MDN, which uniquely define the donor home system. The mapping is done either via GTT at an STP in signaling network 48, not particularly shown, or via an internal look-up table at originating system MSC 50, not particularly shown. This mapping may be done using the MIN-to-MC table, with the MDN as the MIN. The MDN-to-MC GTT table may be an extension of the one used for international roaming. In this case, the translation will be seven digits (1-NPA-NXX) instead of six. Upon receiving the SMDPP, donor MC 62 responds to originating MSC 50 with an smdpp positive acknowledgment.

Figure 1:
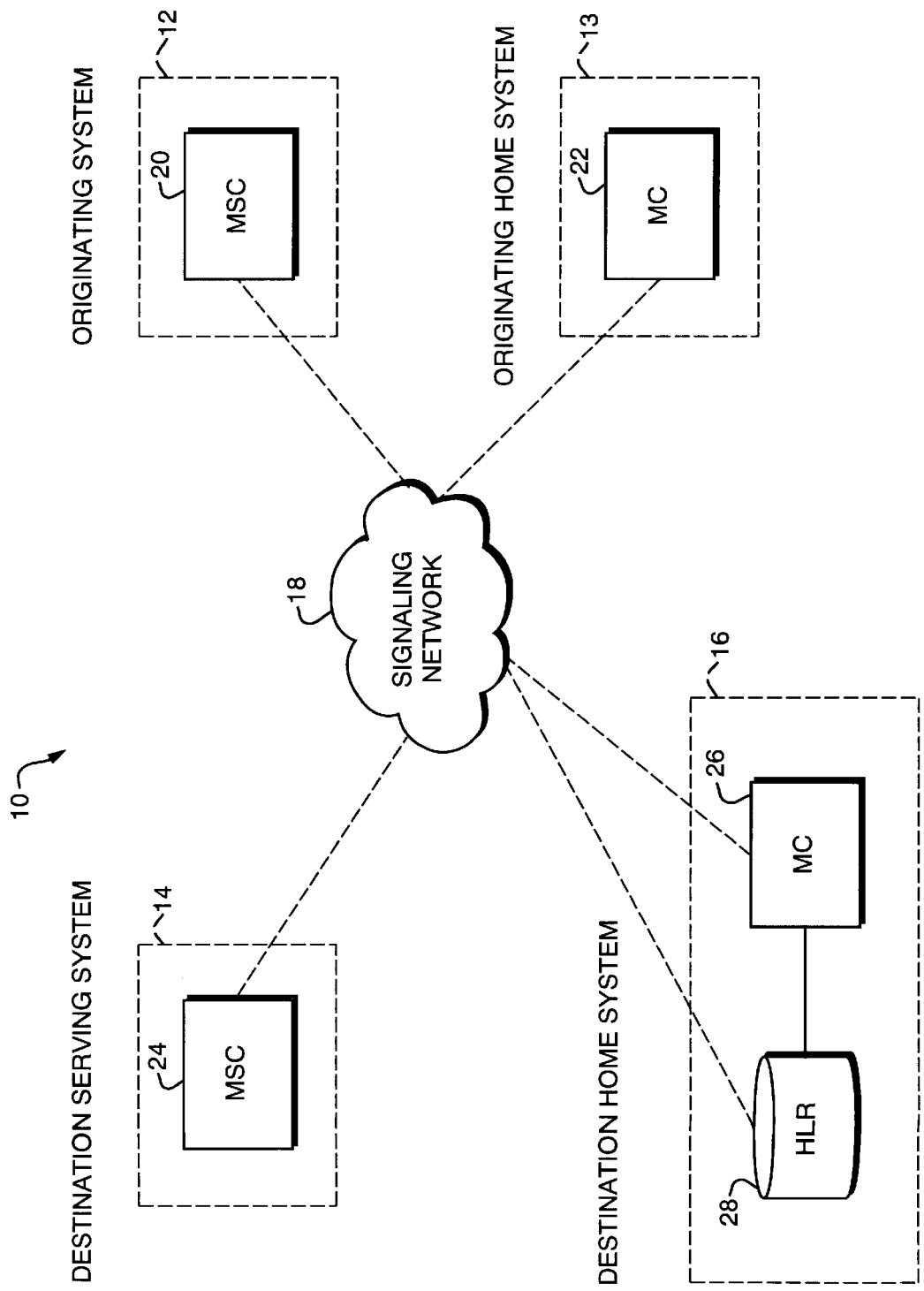
FIG. 1 is a high level block diagram of a network in which a prior art scheme operates.
Figure 2:
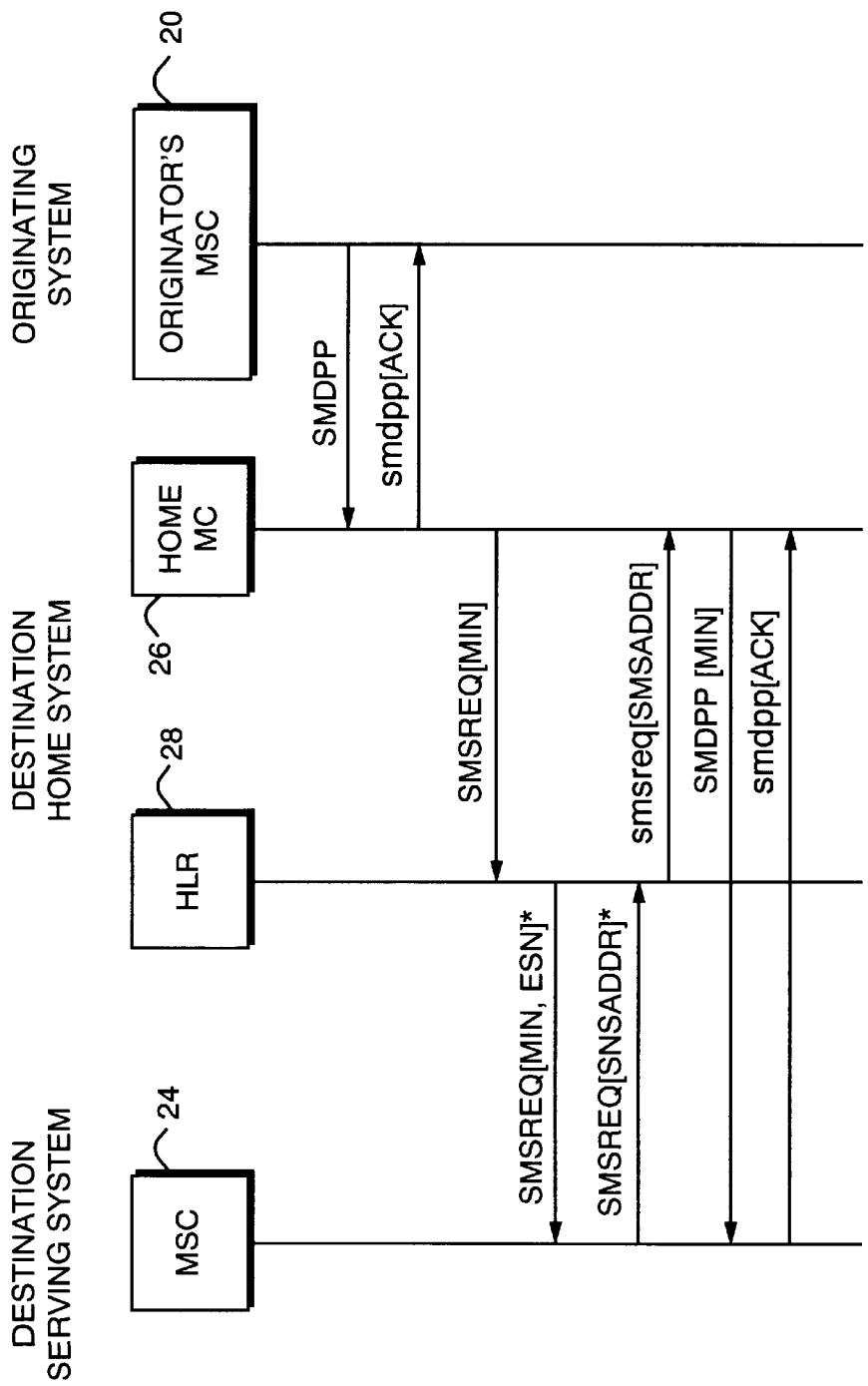
FIG. 2 is a flow diagram of a prior art method for supporting Short Message Services (SMS)
Figure 3:
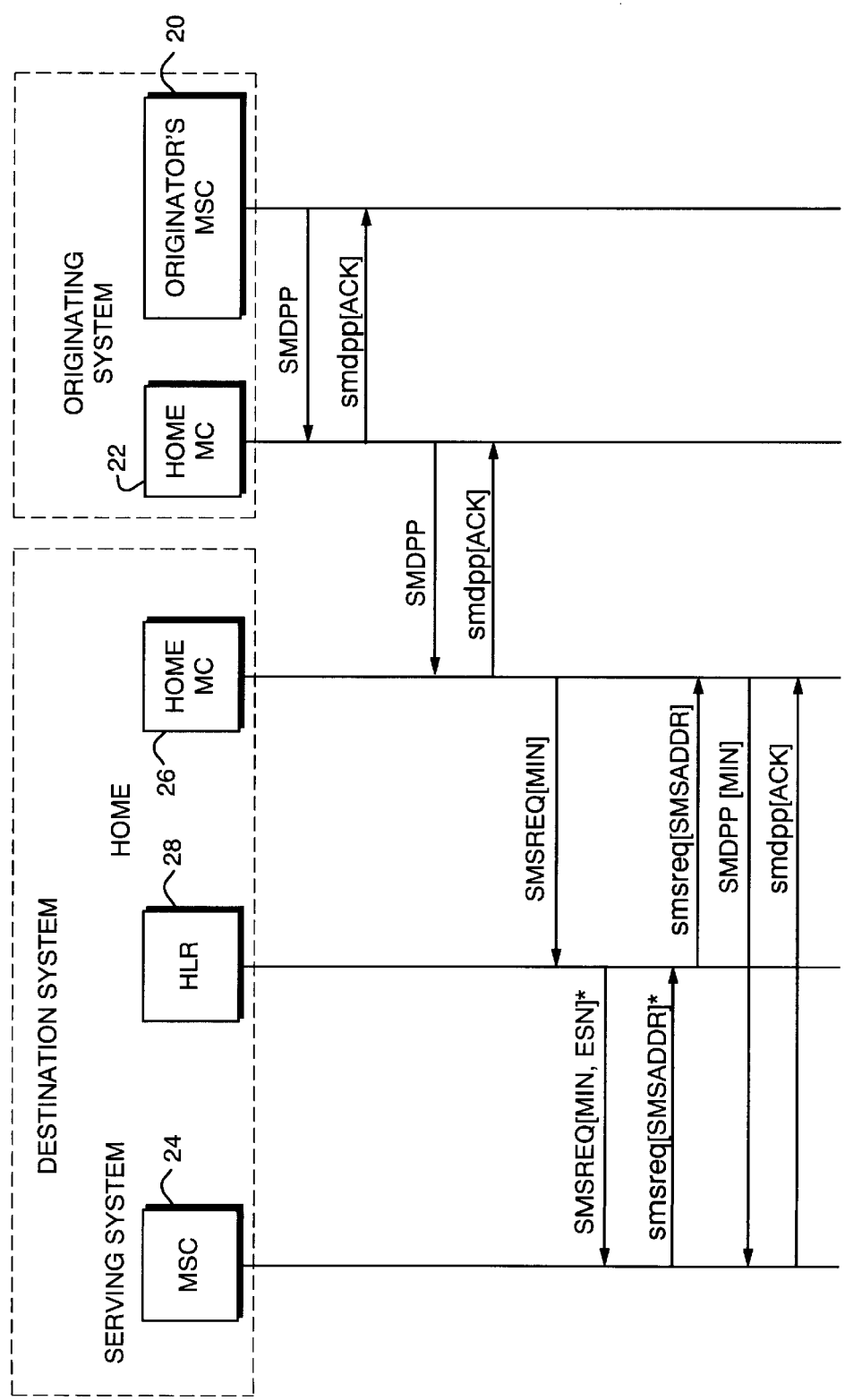
FIG. 3 is a flow diagram of another prior art method for supporting SMS.
Figure 6A:
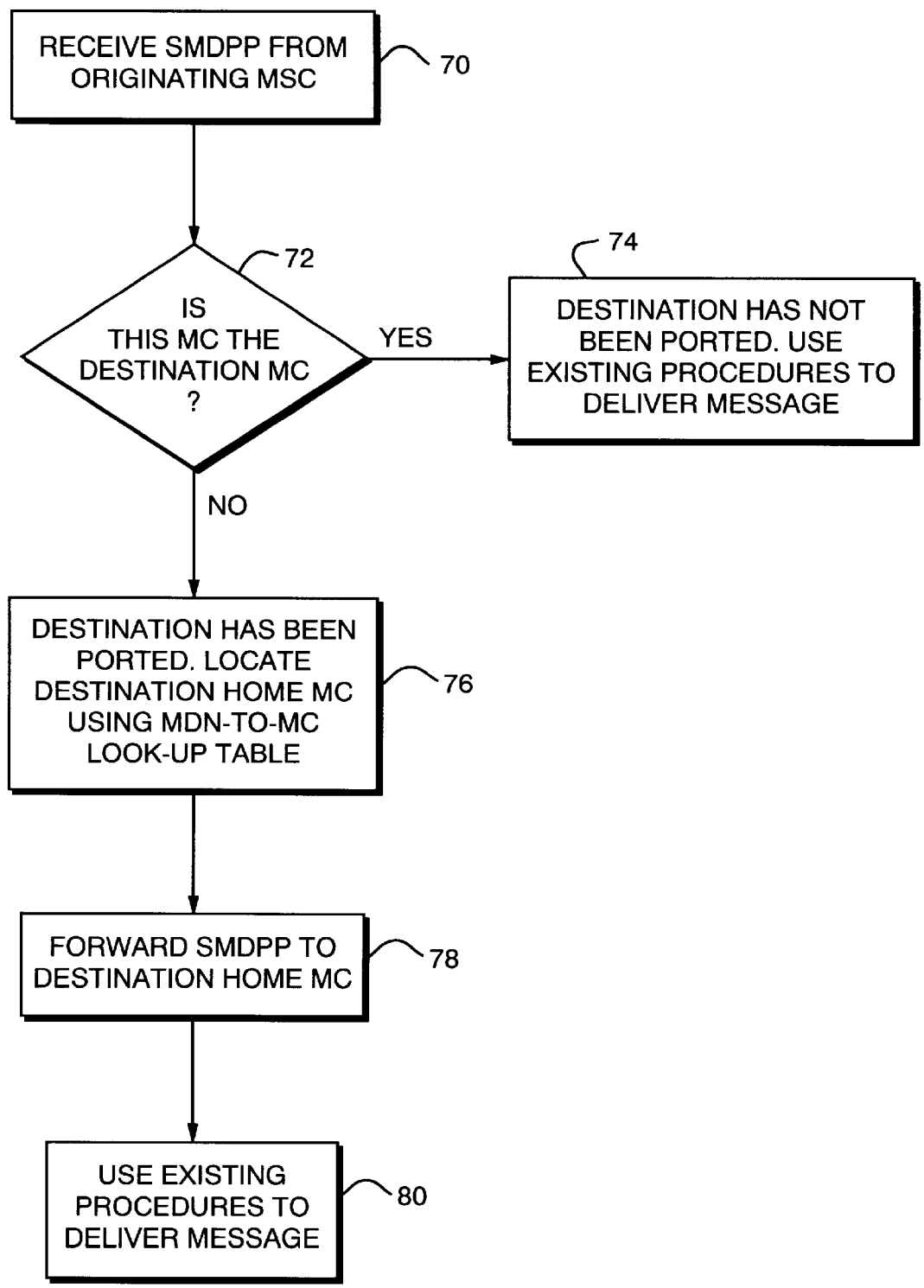
FIGS. 6A–B are flow charts illustrating processing at an SMS message center consistent with the present invention.
Figure 6B:
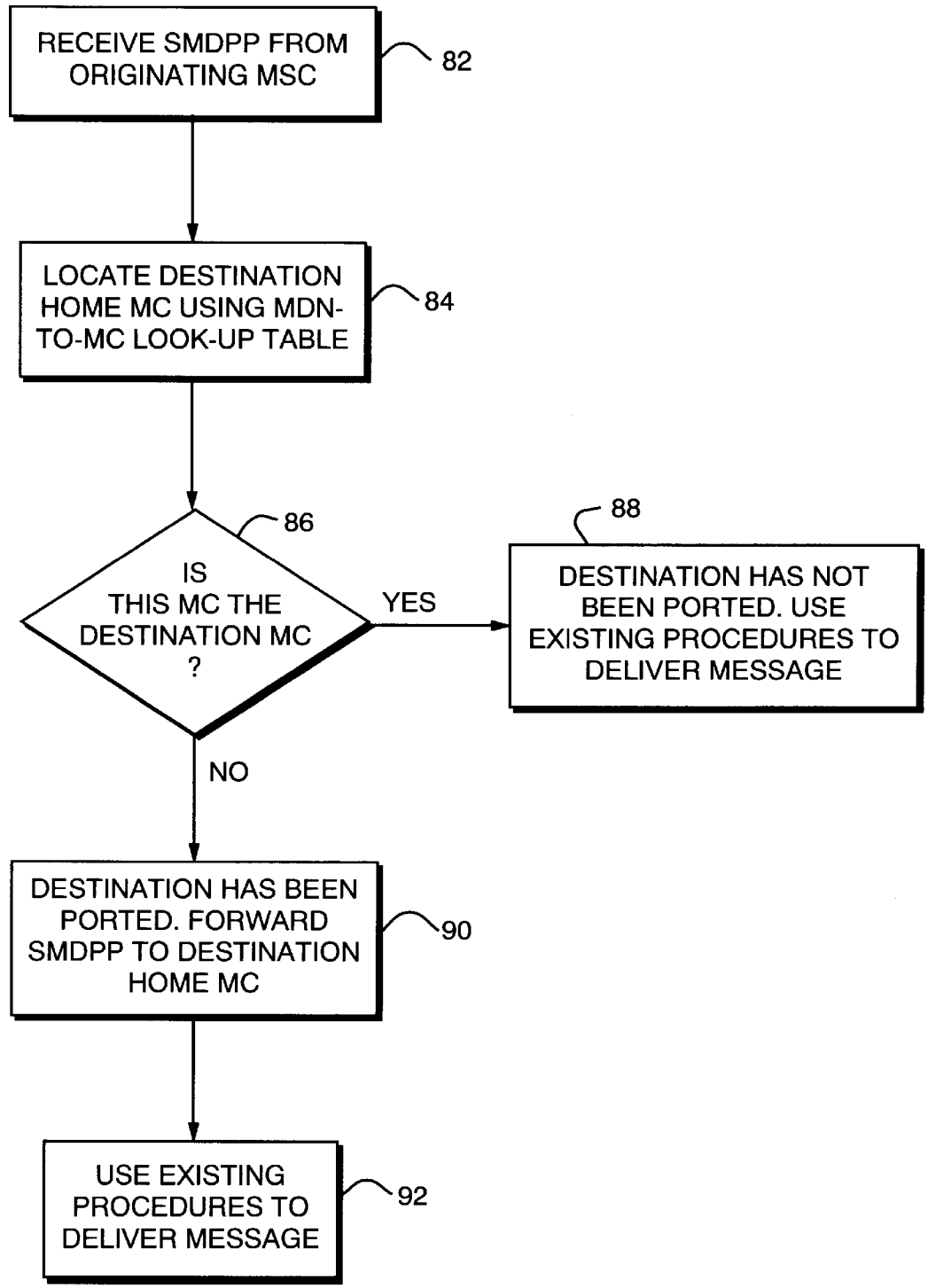

When donor MC 62 receives the SMDPP requesting delivery to a destination MS, it determines whether the destination has been ported to another home system. If the destination has not been ported, then donor system 60 is itself the destination home system. Donor MC 62 also performs an MDN-to-MC mapping, i.e., mapping the destination MDN, provided by the originating subscriber, to the MC of the destination home system associated with that MDN. As illustrated in FIGS. 6A–B, these two steps can occur in either order in a method consistent with the present invention. In FIG. 6A, donor MC 62 first determines whether it is the destination home MC by checking a list of ported out numbers before using the MDN-to-MC look-up table. After receiving the SMDPP from originating MSC 50 (step 70), donor system MC 62 determines whether it itself is the destination home MC (step 72). If donor system MC 62 is the destination home MC, the destination has not been ported, and the donor/destination system MC delivers the message to the destination MSC using existing procedures (step 74), as described in connection with FIG. 2. If donor MC 62 is not the destination home MC, the destination has been ported, and donor MC 62 locates the destination home MC using the internal MDN-to-MC look-up table (step 76). Donor MC 62 then forwards the SMDPP to the destination home MC (step 78), and the message is delivered using existing procedures (step 80).

In FIG. 6B, donor MC 62 does not make an initial determination as to whether the destination has ported. After receiving the SMDPP from the originating MSC (step 82), donor MC 62 uses the internal MDN-to-MC look-up table to locate the destination home MC (step 84). If the donor MC is identical to the destination home MC retrieved from the table (step 86), then the destination has not ported, and the donor/destination MC uses existing procedures to deliver the message to the destination MSC (step 88). If the donor MC is not the same as the destination home MC (step 86), the destination has ported, and donor MC 62 forwards the message to the destination home MC retrieved from the internal MDN-to-MC look-up table (step 90). The destination home MC uses existing procedures to deliver the message (step 92).

Donor MC 62 performs MDN-to-MC translations using an internal look-up table maintained by arrangement between donor MC 62 and wireless service providers. When a subscriber ports from one service provider to another, the old service provider must inform donor MC 62 to terminate message forwarding service for that subscriber's MDN, and the new service provider must request donor MC 62 to forward the ported subscriber's messages to the new destination home MC. Based on information received from the service providers, donor MC 62 updates its look-up table.

Referring again to FIG. 5, if donor MC 62 is the destination home MC or is able to forward the SMDPP to the destination home MC, donor MC 62 responds to originating MSC 50 with an smdpp positive acknowledgment. If the destination has ported, donor MC 62 forwards the short message to destination home MC 56. Once destination home MC 56 receives the SMDPP request, it delivers the short message following existing procedures, as previously described in connection with FIG. 2.

If donor MC 62 is unable to forward the SMDPP to the destination home system because the donor MC fails to map the MDN to the destination home MC (e.g., there is no business arrangement with the wireless service provider or the SMDPP was routed to the donor MC in error), donor MC 62 responds to originating MSC 50 with an SMDPP negative acknowledgment with the SMS_CauseCode value set to 1 for address translation failure.

Although donor MC 62 in FIG. 4 was described as the "original" home MC serving the destination before it is ported, donor MC 62 may also be a third party MC that provides an SMS forwarding service for "original" home systems that do not support SMS. All subscribers' MDNs from a single original system share the same NPA-NXX before porting, so if a third party MC provides SMS forwarding capability as a "donor" MC, it is preferable that the third party MC serve all ported subscribers of one original system. This will allow the preservation of 6-digit mapping in routing short messages from the originating system to the third party donor MC.

Additionally, although FIG. 5 illustrates a method consistent with the present invention in which the originating MSC routes messages directly to the donor MC, a similar method consistent with the present invention exists in which the originating MSC forces messages through originating system MC 52, shown as part of originating home system 43 in FIG. 4. This method is identical to the one illustrated by FIG. 5, except that originating MSC 50 routes the SMDPP to originating MC 52 by performing an $MIN_{sender}$-to-MC mapping, and originating MC 52 routes the SMDPP to donor MC 62 by performing a $MIN_{receiver}$-to-MC mapping, using the MDN of the receiver as the MIN.

The inventive method for routing SMS messages described in connection with FIGS. 4, 5, and 6A–B has several advantages. First, the method requires only 6-digit or 7-digit MDN-to-MC mapping to obtain the donor MC address. Thus, 10-digit translation is avoided. Second, the method does not require a query of the NP-DB, which maintains MDN to switch LRN mappings, to route an SMS message. This may result in a cost savings for wireless carriers who pay for each NP-DB query. Third, short messages destined for MDNs that have not ported are delivered using existing procedures. Finally, the method uses an existing GTT translation type, existing GTT tables at the STP, and existing internal MIN-to-MC tables at the MSCs.

The inventive method described in connection with FIGS. 4, 5, and 6A–B, however, relies on the maintenance of MDN-to-MC look-up tables at all donor system MCs to determine the correct destination home MC address for every ported destination MS. Because look-up tables at donor system MCs may not always be available, an alternate method consistent with the present invention may be used (see FIGS. 7 and 8). In this method, the originating system queries an NP-DB via an STP to obtain the address of the destination home MC.

Figure 7:
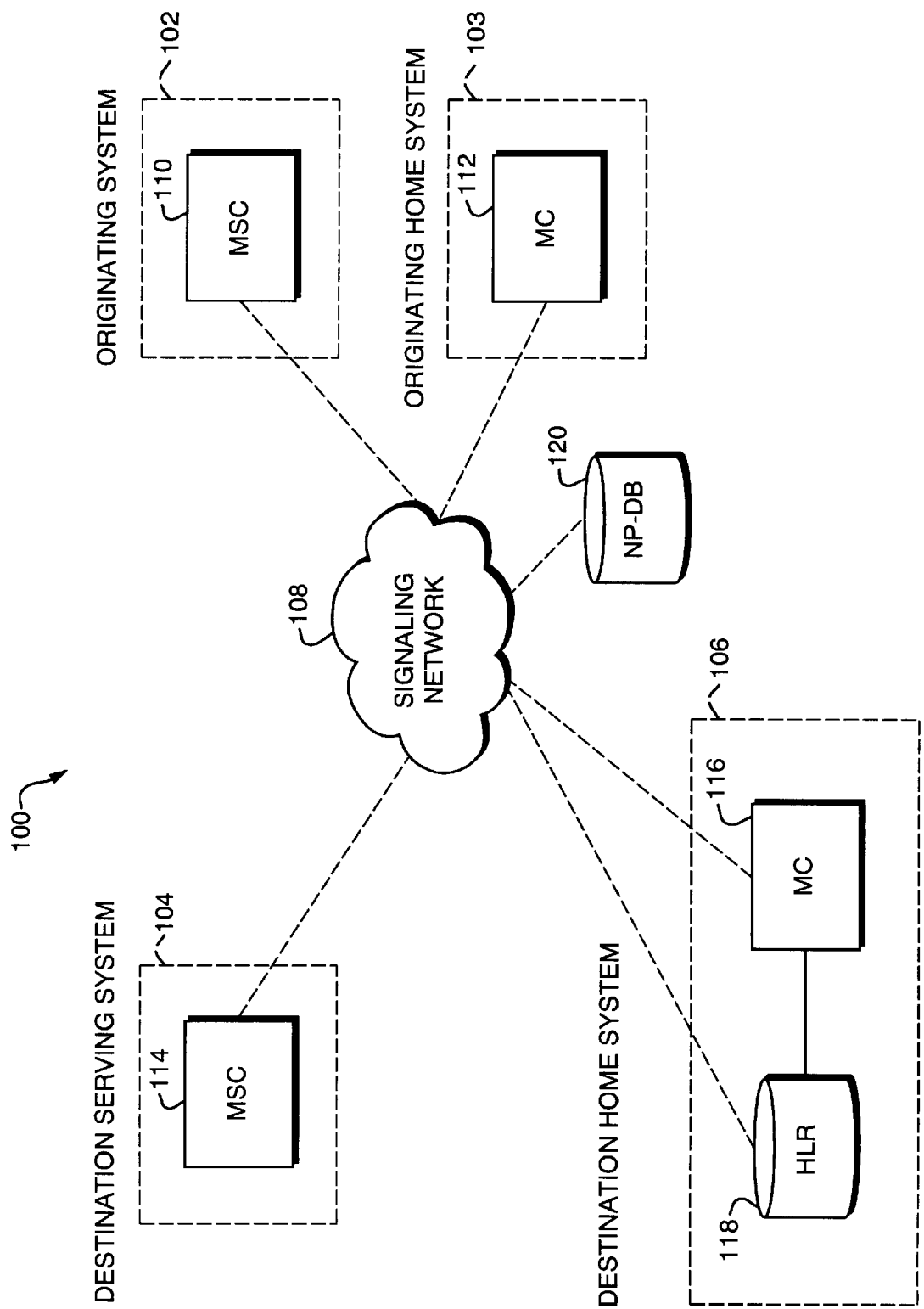
FIG. 7 is a high level diagram of a network in which a scheme consistent with the present invention may operate.

FIG. 7 illustrates a network in which an alternate method consistent with the present invention operates. Within a telecommunications network, indicated generally by reference numeral 100, a short message originates at a subscriber in originating system 102 and is destined for a mobile station (MS) currently served by destination serving system 104. Destination home system 106 is the home system of the destination MS. Communications regarding routing and delivery of the short message, as well as delivery of the short message itself, occur over signaling network 108. The originating subscriber, not particularly shown for the sake of clarity, is served by Mobile Switching Center (MSC) 110 in originating system 102. Originating home system 103 contains Message Center (MC) 112 for storing short messages. The destination MS, not particularly shown for the sake of clarity, is served by MSC 114 in destination serving system 104. Destination home system 106 contains MC 116, which is coupled to Home Location Register (HLR) 118. Alternatively, if MC 116 and HLR 118 are not co-located, they may communicate via signaling network 108.

Network 100 in FIG. 7 also contains NP-DB 120, which may be part of signaling network 108, but is shown separately for the sake of clarity. Additionally, signaling network 108 includes a plurality of STPs, not shown for the sake of clarity.

Figure 8:
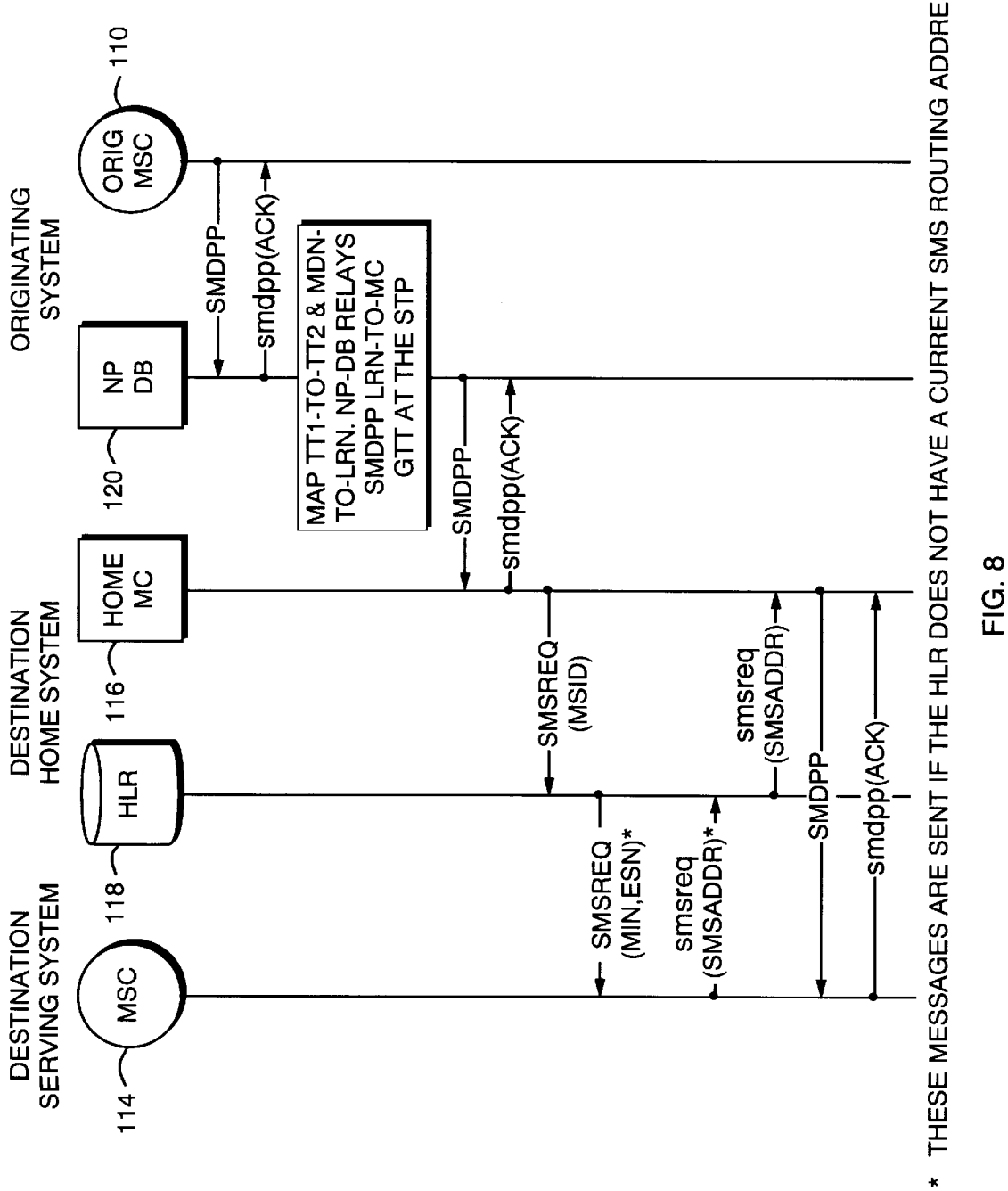
FIG. 8 is a flow diagram of a method for supporting SMS consistent with the present invention.

FIG. 8 is a call flow diagram illustrating a method for successfully routing SMS messages via NP-DB 120 consistent with the present invention. The method relies on NP-DB 120 and STPs in signaling network 108 for translation and routing. As illustrated in FIG. 8, originating MSC 110 routes a short message to NP-DB 120. When the message enters signaling network 108 from originating MSC 110, an STP performs a 6-digit MDN-to-NP-DB GTT translation to obtain the address of NP-DB 120. This requires a new GTT translation type not presently defined. When NP-DB 120 receives the messages, it sends a positive acknowledgment back to originating MSC 110. NP-DB 120 then performs a 10-digit GTT, mapping the MDN to its associated location routing number (LRN) and translating the incoming translation type to a new outgoing translation type. This 10-digit translation may be done at the SCCP level. NP-DB 120 then routes the message back into signaling network 108. An STP in signaling network 108 performs a 6-digit LRN-to-MC GTT mapping to obtain the address of destination home MC 116. This also requires a new GTT translation type not presently defined. The 6-digit LRN-to-MC translation may be done using the existing MIN-to-MC table if the first six digits of the MIN uniquely identify the MC. Once destination home MC 116 receives the message, it delivers and routes the message using existing procedures.

Additionally, although FIG. 8 illustrates a method consistent with the present invention in which the originating MSC routes messages directly to the NP-DB, a similar method consistent with the present invention exists in which the originating MSC forces messages through originating system MC 112, shown as part of originating home system 103 in FIG. 7. This method is identical to the one illustrated by FIG. 8, except that originating MSC 110 routes the SMDPP to originating MC 112 by performing an MDN-to-MC mapping, and originating MC 112 routes the SMDPP to NP-DB 120 by performing a MDN-to-NP-DB mapping.

Advantageously, the method consistent with the present invention illustrated in FIGS. 7 and 8 uses a 10-digit intermediate GTT translation at the NP-DB capable of handling other services such as CLASS, Interswitch Voice Messaging, Calling Name, and ABS/LIDB for the wireline industry. Also, this method uses the NP-DB in such a way that the NP-DB does not need to maintain additional routing information for SMS. Finally, routing the message to the NP-DB and performing a 10-digit intermediate GTT translation is more efficient than querying the NP-DB for the LRN.

Figure 9:
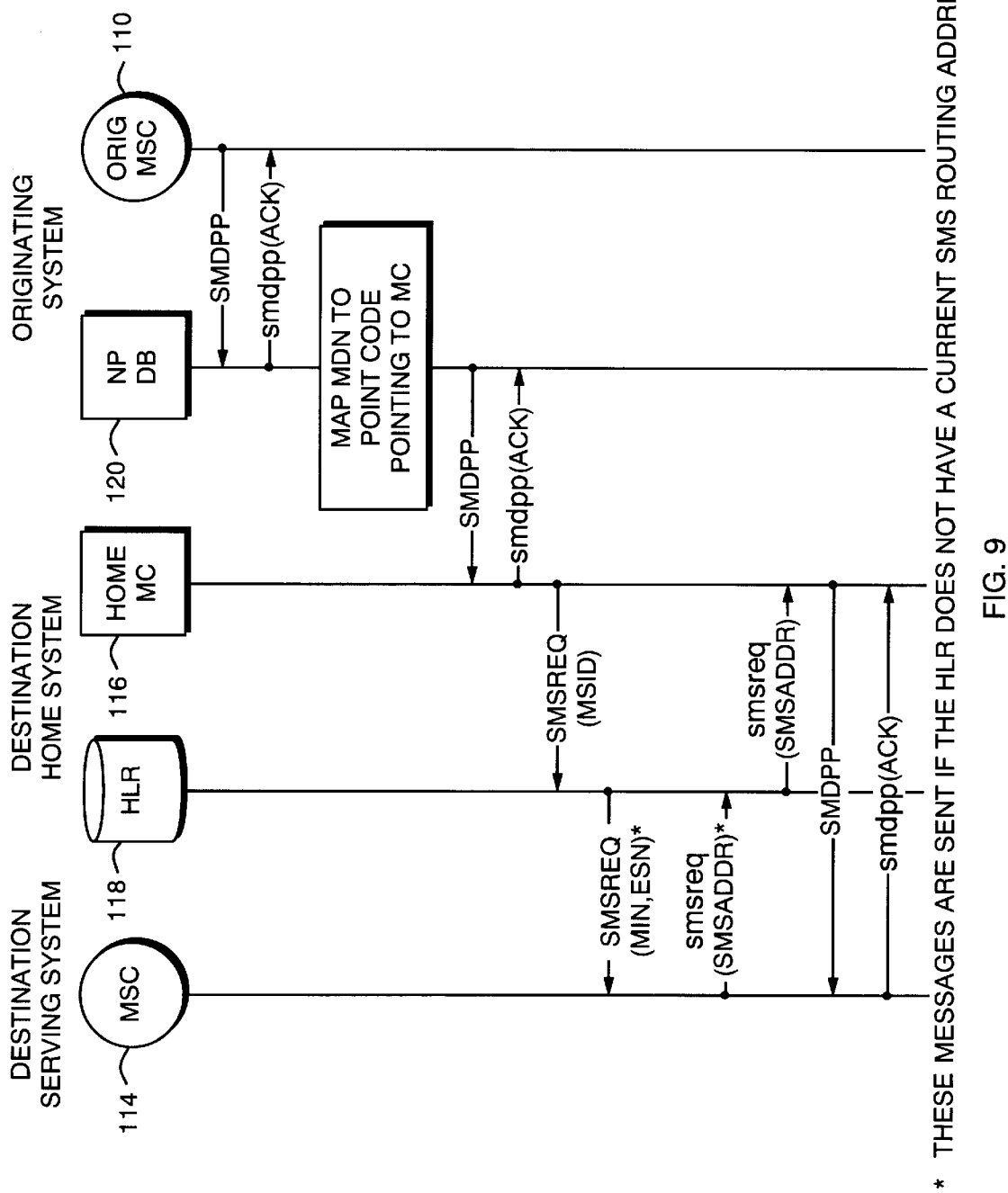
FIG. 9 is another flow diagram of a method for supporting SMS consistent with the present invention.

FIG. 9 is a call flow diagram illustrating an alternate method for successfully routing SMS messages via NP-DB 120 consistent with the present invention. The method relies on NP-DB 120 for translation and routing and uses a point code, a routing address known in the art. As illustrated in FIG. 9, and with reference to FIG. 7, originating MSC 110 routes a short message to NP-DB 120. When the message enters signaling network 108 from originating MSC 110, an STP performs a 6-digit MDN-to-NP-DB GTT translation to obtain the address of NP-DB 120. This requires a new GTT translation type not presently defined. When NP-DB 120 receives the messages, it sends a positive acknowledgment back to originating MSC 110. NP-DB 120 then translates the MDN to a point code pointing to destination home MC 116. NP-DB 120 routes the message back into signaling network 108, which routes the message to destination home MC using the point code obtained from NP-DB 120. Once destination home MC 116 receives the message, it delivers and routes the message using existing procedures.

Additionally, although FIG. 9 illustrates a method consistent with the present invention in which the originating MSC routes messages directly to the NP-DB, a similar method consistent with the present invention exists in which the originating MSC forces messages through originating system MC 112, shown as part of originating home system 103 in FIG. 7. This method is identical to the one illustrated by FIG. 9, except that originating MSC 110 routes the SMDPP to originating MC 112 by performing an MDN-to-MC mapping, and originating MC 112 routes the SMDPP to NP-DB 120 by performing a MDN-to-NP-DB mapping.

It will be apparent to those skilled in this art that various modifications and variations can be made to the SMS message routing scheme of the present invention without departing from the spirit and scope of the invention. For example, a method consistent with the present invention can be used to route SMS messages in a non-WNP environment in which the MSID and MDN are different because the MSID is an IMSI instead of a MIN. It will also be apparent that a method consistent with the present invention can be used to route any type of message, including text and graphics messages. Other embodiments of the invention will be apparent to those skilled in this art from consideration of the specification and practice of the invention disclosed herein. It is intended that the specification and examples be considered exemplary only, with the true scope and spirit of the invention being indicated by the following claims.

We claim:

1. A method for transmitting a message in a network from an originating system, the message destined for a subscriber, wherein a directory number (DN) is assigned to the subscriber, and wherein the subscriber is served by a destination system including a message center (MC), the method comprising the steps of:
   receiving the message from the originating system at a donor system MC;
   translating the DN to an address associated with the destination system MC; and
   routing the message from the donor system MC to the destination system MC using the address.

2. The method of claim 1 wherein the translating step comprises the substep of
   searching a look-up table to obtain the address.

3. The method of claim 1 wherein the translating step comprises the substep of
   performing a global title translation.

4. The method of claim 1 further comprising the steps of
   translating the DN to an address associated with the donor system MC; and
   routing the message from the originating system to the donor system MC using the donor system MC address.

5. The method of claim 4 wherein the step of translating the DN to a donor system MC address comprises the substep of
   searching a look-up table to obtain the donor system MC address.

6. The method of claim 4 wherein the step of translating the DN to a donor system MC address comprises the substep of
   performing a global title translation.

7. A system for transmitting a message in a network from an originating system, the message destined for a subscriber, wherein a directory number (DN) is assigned to the subscriber, and wherein the subscriber is served by a destination system including a message center (MC), the system comprising:
   a donor system MC for receiving the message from the originating system and for routing the message to the destination system MC; and
   means for translating the DN to an address associated with the destination system MC.

8. The system of claim 7 wherein the means for translating the DN includes a look-up table.

9. The system of claim 7 wherein the means for translating the DN includes means for performing a global title translation.

10. The system of claim 7 further comprising
    means for translating the DN to an address associated with the donor system MC; and
    means for routing the message from the originating system to the donor system MC using the donor system MC address.

11. The system of claim 10 wherein the means for translating the DN to an address associated with the donor system MC comprises a look-up table.

12. The system of claim 10 wherein the means for translating the DN to an address associated with the donor system MC includes means for performing a global title translation.

13. A method for transmitting a message in a network from an originating system, the message destined for a subscriber, wherein a directory number (DN) is assigned to the subscriber, and wherein the subscriber is served by a destination system including a message center (MC), the method comprising the steps of:
    routing the message from the originating system to a database;
    translating the DN to a routing number associated with the subscriber;
    routing the message from the database to a signaling network;
    translating the routing number to an address associated with the destination system MC; and
    routing the message from the signaling network to the destination system MC using the address.

14. The method of claim 13 wherein the step of routing the message from the originating system comprises the substeps of
    performing a global title translation from the DN to an address associated with the database; and
    routing the message using the database address.

15. The method of claim 13 wherein the step of translating the DN to a routing number comprises the substeps of
    performing a global title translation from the DN to the routing number; and
    translating an incoming translation type to an outgoing translation type.

16. The method of claim 13 wherein the step of translating the routing number comprises the substep of
    performing a global title translation from the routing number to the address associated with the destination system MC.

17. A system for transmitting a message in a network from an originating system, the message destined for a subscriber, wherein a directory number (DN) is assigned to the subscriber, and wherein the subscriber is served by a destination system including a message center (MC), the system comprising:

a database;

means for routing the message from the originating system to the database;

means for translating the DN to a routing number associated with the subscriber;

means for routing the message from the database to a signaling network;

means for translating the routing number to an address associated with the destination system MC; and means for routing the message from the signaling network to the destination system MC using the address.

18. The system of claim 17 wherein the means for routing the message from the originating system comprises means for performing a global title translation from the DN to an address associated with the database; and means for routing the message using the database address.

19. The system of claim 17 wherein the means for translating the DN to a routing number comprises means for performing a global title translation from the DN to the routing number; and means for translating an incoming translation type to an outgoing translation type.

20. The system of claim 17 wherein the means for translating the routing number includes means for performing a global title translation from the routing number to the address associated with the destination system MC.

* * * * *